United States Patent [19]
Lawless

[11] 3,940,873
[45] Mar. 2, 1976

[54] SHIELD FOR FISH HOOKS AND SIMILAR BARBED HOOK-LIKE MEMBERS

[76] Inventor: Earl E. Lawless, P.O. Box 472, Georgetown, Calif. 95634

[22] Filed: Jan. 17, 1975

[21] Appl. No.: 541,824

[52] U.S. Cl. .......................... 43/57.5 R; 24/DIG. 18
[51] Int. Cl.² .................................. A01K 97/06
[58] Field of Search ...... 43/57.5 R; 24/204, 245 FF, 24/DIG. 18

[56] References Cited
UNITED STATES PATENTS

| | | | |
|---|---|---|---|
| 786,352 | 4/1905 | Frost | 43/57.5 R |
| 2,932,118 | 4/1960 | Jend | 43/57.5 R |
| 3,279,008 | 10/1966 | Wallach | 24/DIG. 18 X |
| 3,421,188 | 1/1969 | Rock | 24/204 |
| 3,646,641 | 3/1972 | Roben | 24/245 FF X |

FOREIGN PATENTS OR APPLICATIONS

| | | | |
|---|---|---|---|
| 1,101,317 | 3/1961 | Germany | 24/245 FF |

Primary Examiner—Hugh R. Chamblee
Assistant Examiner—Daniel J. Leach
Attorney, Agent, or Firm—Townsend and Townsend

[57] ABSTRACT

A low cost, lightweight hook shield comprising a unitary member fabricated from a flexible material and having two mating body portions joined together along facing edges by an integral hinge. Each body portion is provided with a complementary pad of Velcro on the inner facing surface, the pads serving to releasably secure the mating body portions in a folded attitude and to embrace a barbed hook. The free end of each body portion is provided with a tab-like projection which may be grasped by the fingers of the user to facilitate unfolding of the shield.

4 Claims, 3 Drawing Figures

SHIELD FOR FISH HOOKS AND SIMILAR BARBED HOOK-LIKE MEMBERS

BACKGROUND OF THE INVENTION

This invention relates to shields for barbed hook-like members, particularly fishhooks.

Exposed fishhooks and other barbed hook-like members can accidentally inflict annoying and sometimes dangerous wounds. Moreover, exposed fishhooks frequently become entangled with other hooks, fishing lines or other fishing tackle when stored in a tackle box or left attached to a fishing line. To avoid these difficulties attendant with the use of fishhooks, shields have been designed to cover the barbs, representative examples of which are disclosed in U.S. Pat. Nos. 206,206; 2,932,118; 3,141,258; and 3,453,770. However, known shields have been found to suffer from one or more disadvantages, such as relatively high cost, bulky size or weight, and inconvenience in attachment or removal.

SUMMARY OF THE INVENTION

The invention comprises a low cost, lightweight shield which is simple and convenient to use and which provides complete shielding of a fishhook or other similar barbed instrument.

In the preferred embodiment, a unitary member fabricated from a flexible material has two mating body portions joined together along facing edges thereof by an integral hinge. To the inner facing surfaces of each body portion is adhered a complementary pad of Velcro which serves both to releasably secure the two mating body portions in a folded attitude and to embrace a barbed hook.

In use, a hook is placed on either pad and the mating body portions are folded along the hinge until the Velcro pads are mutually engaged with the hook therebetween. To release the hook, the two portions are unfolded about the hinge, whereupon the hook may be removed. To facilitate unfolding of the device, the free end of each body portion opposite the integral hinge is provided with a tab-like extension which may be grasped between the fingers.

For a fuller understanding of the nature and advantages of the invention, reference should be had to the ensuing detailed description taken in conjunction with the accompanying drawings.

DESCRIPTION OF THE PREFERRED EMBODIMENT

Figure 1:
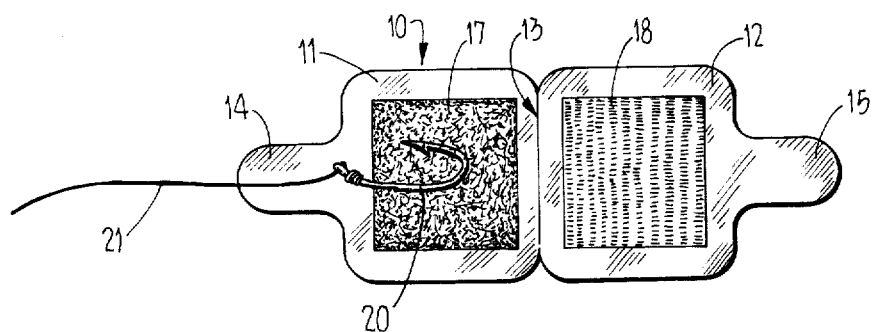
FIG. 1 is front elevational view of a preferred embodiment of the invention in the open position.

Turning now to the drawings, FIG. 1 shows a front elevational view of a preferred embodiment of the invention in the open position. The preferred embodiment comprises a unitary member generally designated by reference numeral 10 and having complementarily configured portions 11, 12 joined along facing edges thereof by means of a unitary hinge portion 13. Each body portion is formed in a generally rectangular shape and is provided with a tab-like extension 14, 15 along the free edge thereof opposite integral hinge portion 13. Secured to the inner facing surfaces of body portions 11, 12 are a complementary pair of generally rectangular pads 17, 18 preferably fabricated from Velcro or other similar material known to those skilled in the art. Unitary member 10 may be fabricated from any flexible material having resistance to fatigue when flexed, such as polypropylene, polyurethane, leather or other equivalent materials known to those skilled in the art. When used in a fishing environment, the material should also be preferably water resistant.

Figure 2:
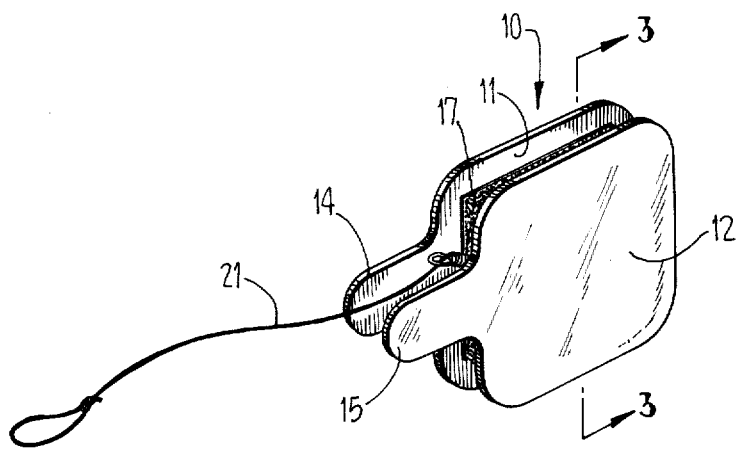
FIG. 2 is a perspective view of the embodiment of FIG. 1 in closed position.
Figure 3:
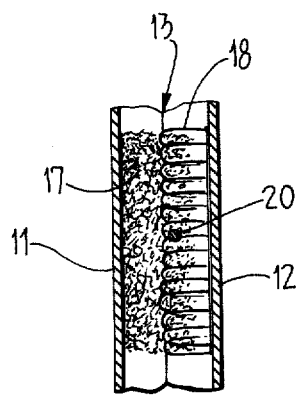
FIG. 3 is a partial sectional view taken along lines 3—3 of FIG. 2.

The device is employed by placing a barbed hook, such as fishhook 20 mounted on leader 21, on one of the pads 17, 18 and folding member 10 about hinge portion 13 to the closed position illustrated in perspective in FIG. 2. In the closed position, the barbed portion of hook 20 is completely shielded and restrained against movement by complementary body portions 11, 12 and pads 17, 18. As shown in the enlarged partial sectional view of FIG. 3, that portion of hook 20 lying within the perimeter of pads 17, 18 is embraced by the individual fibers of the Velcro material to restrain the hook 20 against movement out of the shield provided by the invention. In addition, pads 17, 18 retain body portions 11, 12 in the folded attitude to insure that the hook 20 will not be accidentally uncovered. Fishhook 20 may be released by simply grasping tabs 14, 15 and forceably separating body portions 11, 12 by unfolding about hinge portion 13.

Fishhook shields constructed in accordance with the invention have been found to possess several advantages. Due to the simplicity in design and materials employed, such shields may be fabricated at extremely low cost and possess a relatively long useful lifetime. Further, due to their small size and light weight, many shields may be accommodated in an ordinary fishing tackle box without adding significantly to the total weight of the fishing tackle. Moreover, the shields may be used with hooks already mounted on a fishing line, without the necessity of removing the hooks from the line, and may be also used in the tackle box with individual hooks of various shapes and sizes. In addition, the shields may be made in various shapes and sizes to accommodate fishhooks of different size and style.

While the above provides a full and complete disclosure of the preferred embodiment of the invention, various modifications, alternate constructions and equivalents may be employed without departing from the true spirit and scope of the invention. Therefore, the above description and illustrations should not be construed as limiting the scope of the invention which is defined by the appended claims.

What is claimed is:

1. A safeguard hook mitten for releasably embracing a barbed hook-like member, said mitten comprising:

a substantially flat sheet of non-metallic soft flexible material having complementarily configured body portions joined along one edge thereof by an integral fold portion to permit said body portions to be folded along said fold portion to a releasable closed position; and a pair of complementary hook pad means each secured to the inner facing surface of a different one of said body portions for embracing a barbed portion of said hook-like member and for releasably maintaining said body portions in said closed position.

2. The combination of claim 1 wherein each of said body portions is provided with an integrally formed tab-like projection extending from an edge thereof generally opposite said hinge.

3. The combination of claim 1 wherein said pad means are fabricated from Velcro.

4. The combination of claim 1 wherein the opposing major surfaces of said flat sheet are substantially planar.

* * * * *